United States Patent
Florian et al.

[15] 3,690,692
[45] Sept. 12, 1972

[54] FOLDABLE LAWN AND GARDEN CART

[72] Inventors: Berkeley Julian Florian; Berkeley Jay Florian, both of 88 West St., Plantsville, Conn. 06479

[22] Filed: Nov. 16, 1970

[21] Appl. No.: 89,695

[52] U.S. Cl. ................................ 280/36 C, 220/6
[51] Int. Cl. .......................................... B62b 11/00
[58] Field of Search ..280/36 C, 36 R, 41 C, 47.26 X; 220/6

[56] References Cited

UNITED STATES PATENTS

| | | | |
|---|---|---|---|
| 2,564,939 | 8/1951 | Weast | 280/36 C |
| 2,431,834 | 12/1947 | Sinclair | 280/36 C |
| 2,371,472 | 3/1945 | Ruff | 280/36 C |

Primary Examiner—Benjamin Hersh
Assistant Examiner—Robert R. Song
Attorney—Clarence A. O'Brien and Harvey B. Jacobson

[57] ABSTRACT

A foldable two-wheeled low-slung lawn and garden cart characterized by a hopper-type wheelbarrow, that is, an adaptation wherein the barrow or receiver comprises panel-type front and back walls whose lower flanged ends are hingedly joined. The opposed vertical side walls are made up of paired triangular panels whose outer marginal edges are hingedly joined to coacting marginal flanges on the front and back walls. The inner vertical edges of these side wall panels are hingedly joined and when collapsed inwardly they are sandwiched with requisite nicety between the folded front and back walls. A hook-type fastener serves to hold the collapsible walls closed and channel clips serve to hold the side walls open.

10 Claims, 6 Drawing Figures

PATENTED SEP 12 1972 3,690,692
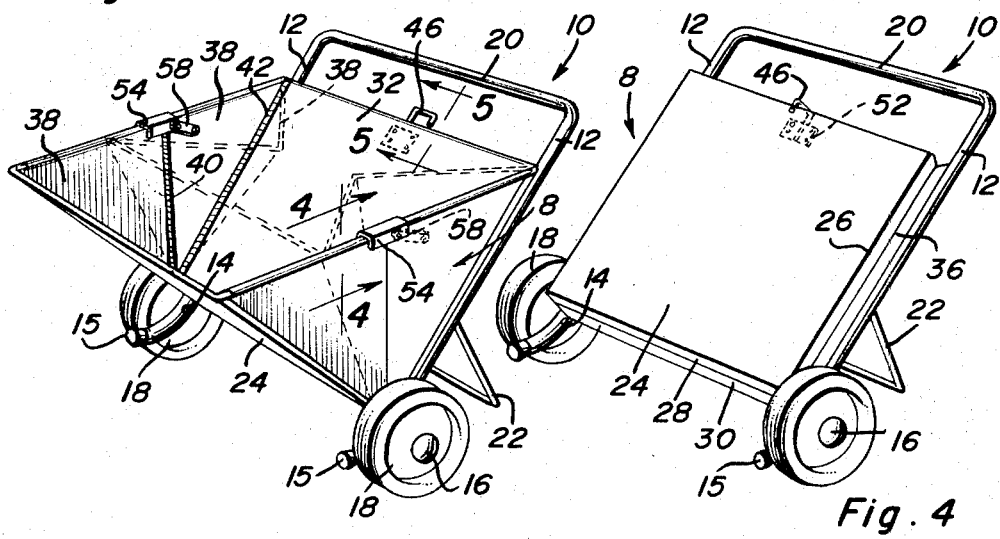
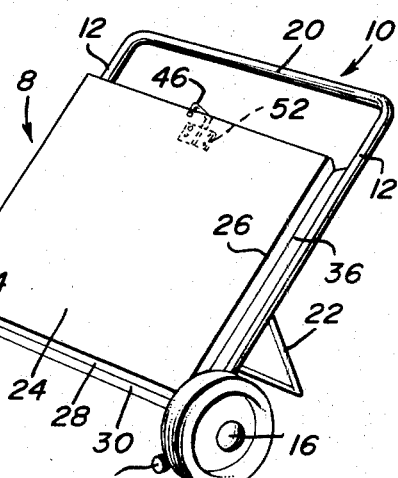
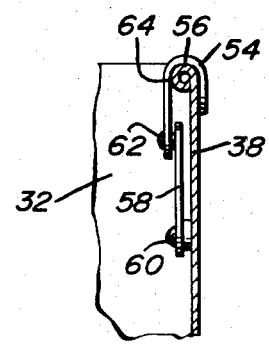
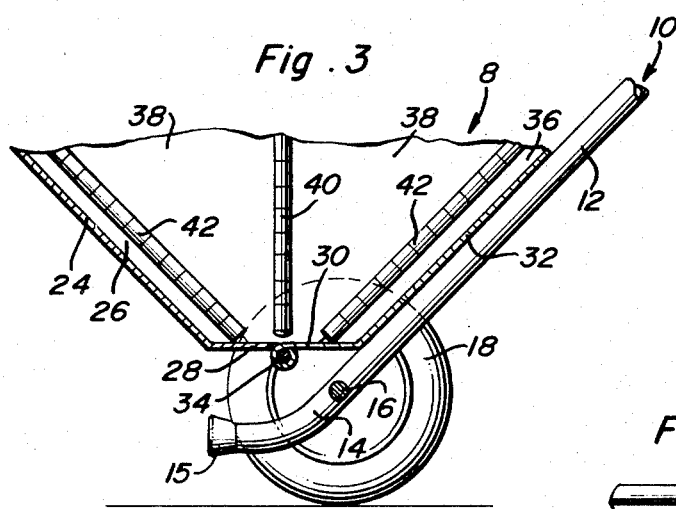
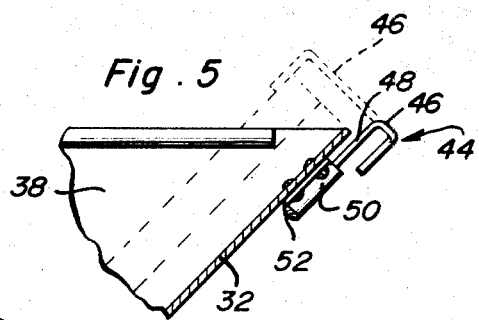
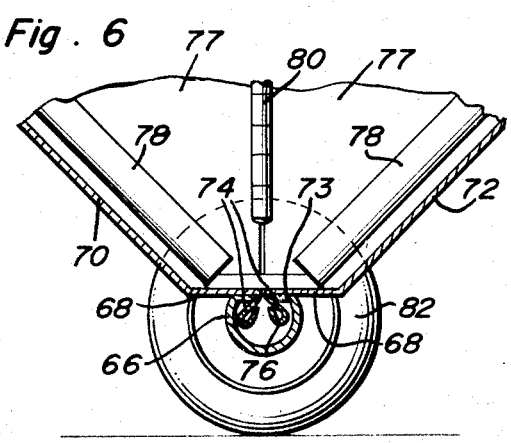
Berkeley Julian Florian
Berkeley Jay Florian
INVENTOR.
BY Clarence A. O'Brien
and Harvey B. Jacobson
Attorneys

FOLDABLE LAWN AND GARDEN CART

This invention relates, broadly classified, to wheelbarrows and, more specifically stated, to a low-slung two-wheeled lawn and garden cart wherein the barrow or receiver comprises a relatively deep V-type hopper whose front, back and side walls are hingedly joined and can be folded to assume compact relationship for handling, transporting and storing.

For background purposes and with a view toward classifying the instant invention it can be kept in mind that two-wheeled push-pull lawn and garden carts basically similar to the one shown are on the open market. Nor is it new to provide carts and wheelbarrows which are foldable for compactness and convenience, particularly when being transported or stored as the case may be. The U.S. Pat. to Rome C. Seyforth, No. 2,767,996, reveals a two-wheeled cart construction wherein the barrow is sectional and collapsible.

An object of the present invention, broadly construed, is to improve upon prior art foldable-type lawn and garden carts and, in so doing, to advance the art and to provide an adaptation which is structurally unique and well serves the purposes for which it has been devised.

Briefly the herein disclosed cart has to do with a barrow or receiver which embodies downwardly converging dual wheel supported panels which define front and back walls and have opposed lower ends which are aligned to confront each other and are foldably and hingedly joined. Load confining side walls cooperate with the front and back walls to provide a hopper-type barrow. More explicitly the side walls are made up of paired triangular panels which have adjacent inner vertical edges hingedly joined to each other and outer marginal edges which are hingedly and foldably joined to coacting marginal edges of the front and back panels or walls. REadily accessible and usable retaining means is provided to retain the triangular panels in spread or open position. A simple hook-type latch is mounted on the upper portion of the back wall and the bill portion thereof serves to engage and retain all six panels in properly folded and nested relationship.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective of a foldable two-wheeled low slung lawn and garden cart constructed in accordance with the invention and showing how the panels of the side walls can be folded inwardly to facilitate collapsing the over-all cart for handling, transporting or storage as the case may be.

FIG. 2 is a view in perspective similar to FIG. 1 showing how the component parts coordinate when the walls are folded or collapsed and fastened in closed or nested relationship.

FIG. 3 is a view in section and elevation and on a suitably enlarged scale and fragmentarily presented and showing certain of the panel connecting hinges.

FIG. 4 is a detail view taken approximately on the plane of the vertical section line 4—4 of FIG. 1 looking in the direction of the indicating arrows.

FIG. 5 is a similar fragmentary detailed view taken on the plane of the section line 5—5 of FIG. 1.

And FIG. 6 is a view similar to FIG. 3 showing modified hinges which can, if desired, be used in lieu of the piano hinges illustrated for example in FIG. 3.

With reference now to FIGS. 1 to 5 in particular, the hopper-type receiver or barrow is denoted by the numeral 8 and the handle means by the numeral 10. The handle means comprises a simple tubular or equivalent one-piece inverted U-shaped frame, that is a frame embodying a pair of coplanar duplicate legs 12 which are in a common plane and have lower free ends 14 provided with stub axles 16 supporting suitably constructed ground engaging wheels 18. The upper bight portion 20 constitutes a cross member and provides an appropriate push-pull handle. This handle bridges the space between the upper ends of the legs 12. The lower median portions of the legs are provided with an appropriate prop 22 which constitutes a rest in the manner shown in FIGS. 1 and 2. This thus constructed wheel supported frame provides a low slung carrier or support for the six-walled open top barrow or receiver. This unit is preferably constructed from appropriate sheet material and is characterized by a substantially flat faced front wall or panel 24 having laterally bent side flanges 26 and having a suitably angled broader bottom flange 28. The flange 28 coordinates with a similar flange 30 on the lower portion of the back panel or wall 32. The confronting edge portions of the bottoming flanges are interconnected by appropriate hinge means 34 which is broadly referred to as a piano-type hinge. It should be noted that the back wall or panel spans the space between the legs 12 and in fact has its edge portions seated and fastened on the legs. The outstanding side or marginal flanges of the panel are here denoted at 36.

The side walls correspond in construction and each side wall is made up of a pair of triangular panels 38. These panels are of duplicate construction and are oriented to provide a collapsible load confining side wall. The adjacent or abutting vertical marginal edges of the two panels 38 are connected by hinge means 40. The outer marginal edges of the two panels are connected by similar hinges 42 to the aforementioned flanges 26 and 36 as shown in FIG. 3. With this arrangement the triangular panels can be folded into the receptacle portion after which the front wall can be folded toward the back wall with the result that the panels 38 are sandwiched or nested between the walls 24 and 32. When thus collapsed the walls are held in compact relationship by fastening means. The fastening means comprises a J-shaped latch or hook 44 (FIG. 5). The bill portion 46 of the hook is such that it can straddle the upper edges of the collapsed walls to maintain all of the walls in closed relationship. The shank or stem 48 is suitably anchored and rotatable in the socket member 50 of an adapter bracket 52 fastened to the upper exterior portion of the back wall or panel 32. By considering FIGS. 1, 2 and 5 the construction of this fastening means will be clear.

Suitable fastening means is also provided to maintain the triangular panels 38 in spread relationship. This means comprises a channel-shaped clip 54 of a size and shape to engage over the bead 56 and which serves to straddle the hinge joint as brought out in FIG. 1. A link 58 is provided and has its lower end pivotally anchored as at 60 and its upper end pivotally connected at 62 to a component part 64 of the clip. Thus these channel-type link-held clips function in the manner illustrated in FIGS. 1 and 4.

As is evident from the disclosure of FIGS. 1 to 5 inclusive the foldable front, back and side walls can be constructed and arranged to provide the adaptation shown in open ready-to-use position in FIG. 1 and in collapsed storing or handling position as shown in FIG. 2. Simple so-called piano hinges are used for assembling and foldably adjoining the front, back and side panels. However, it is within the purview of the invention to employ another form of hinge means as shown for instance in FIG. 6. Several of the hinges are here shown but the one appearing in section is illustrative of the detailed construction of this type of hinge. This is to say the hinges occupy the same position and relationship as the piano hinges in FIGS. 1 and 3. Each hinge comprises a suitably elongated hollow or tubular sheath 66. The flat-walled slotted portion 73 of the sheath is arranged beneath and abuts the flanges 68 at the bottom portions of the front and back walls or panels 70 and 72. The flanges 68 have oblique-angled depending lips 74 which extend through the slot provided therefor and have their free edges fashioned into retaining beads 76. The beaded lips confront each other and fit through the existing slot means and into the hollow portion of the sheath in a manner to provide the mechanical hinging connection between the parts. The outer marginal edges of the side wall panels 77 are likewise constructed to cooperate with the downwardly diverging sheaths 78 which need not, it is believed, be further detailed. Thus, the manufacturer may prefer to use the piano-type hinge shown at 80 or the sheath-type if desired. The open ends of the sheath 66 serve to accommodate suitable mounting axles (not detailed) on the ground engaging wheels 82.

It is submitted that the fastening and retaining means for the triangular side panels 38 will be clear upon considering FIGS. 1 and 4. The hook-type latching means 44 for the folded panels or sections will be clear upon considering FIGS. 2 and 5.

The construction and assembling and oriented relationship of the two styles or forms of hinges will be clear particularly when comparing FIGS. 3 and 6.

The manner in which the hopper-type receiver is set up for use is clear in FIG. 1 and the manner in which the parts are collapsed and nested for storage is shown in FIG. 2. Accordingly, a more extended description is believed to be unnecessary.

It will be noted that the forward or leading ends of the legs 12 are arcuately curved to provide extensions 15 and which project approximately one-fourth inch beyond the outside diameter of the wheels 18. The purpose of each extension 15 is twofold: first, the extension acts as legs to lift the cart wheels off the floor when folded and leaning against a wall for storing. This will prevent the cart from rolling. Second; when the cart is in use with front panel in horizontal position when raking leaves or the like into the cart (similar to a dust pan), the extension protrudes into the ground and acts as a brake to prevent the cart from being pushed backwards.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A foldable lawn and garden cart comprising a hopper-type barrow provided with ground engaging wheels and inverted U-shaped prop-equipped handle means, said barrow embodying a pair of like downwardly converging rigid panels defining companion front and back walls and having complemental lower ends aligned and hingedly foldably joined, load confining side walls, spanning the spaces between said front and back panels and embodying paired triangular panels which are rigid and have adjacent inner vertical edges hingedly joined to each other and outer marginal edges hingedly and foldingly joined to coacting marginal edges of said front and back wall panels, readily accessible and manually usable first retaining means operatively mounted on predetermined upper edges of said triangular panels and adapted when in use to position and retain said triangular panels in coplanar in-use position and also adapted to release said triangular panels at will for compact and convenient inward face-to-face folding, and second readily accessible and manually usable retaining means operatively mounted on a median upper edge portion of said back panel and releasably engageable with an upper edge portion of said front panel in a manner to temporarily position and retain all of said panels in compact folded and portable relationship for storage and subsequent erected usage.

2. A foldable lawn and garden cart comprising a hopper-type barrow provided with ground engaging wheels and handle means, said barrow embodying companion downwardly converging panels defining front and back walls and having opposed lower ends which are foldably hingedly joined, load confining side walls, said side walls embodying paired triangular panels which have adjacent inner vertical edges hingedly joined to each other and outer marginal edges hingedly and foldingly joined to coacting marginal edges of said front and back panels, readily accessible and usable first retaining means operatively mounted on predetermined ones of said triangular panels and adapted to position and retain said triangular panels in an in-use position and to release the same at will for folding, and second readily accessible and usable retaining means operatively mounted on said back panel and releasably engageable with said front panel in a manner to temporarily position and retain all of the panels in compact folded relationship for storage and subsequent erected usage, said opposed lower ends being provided with angled coplanar flanges which have confronting and abutting marginal edges, said edges being joined by hinge means, said front and the coordinating marginal edges of said side wall panels being hingedly joined with their respectively cooperable side marginal flanges.

3. The lawn and garden cart defined in and according to claim 2, and wherein said handle means comprises an inverted U-shaped frame embodying a pair of like legs joined at their upper ends by a bridging handle, said back panel having marginal portions positioned and resting atop and being fixed to said legs.

4. A foldable lawn and garden cart comprising a hopper-type barrow provided with ground engaging wheels and prop-equipped handle means, said barrow embodying companion downwardly converging panels defining front and back walls and having opposed lower ends which are foldably hingedly joined, and load confining side walls, said side walls embodying paired triangular panels which have adjacent inner vertical edges hingedly joined to each other and outer marginal edges hingedly and foldingly joined to coacting marginal edges of said front and back panels, readily accessible and usable first retaining means operatively mounted on predetermined ones of said triangular panels and adapted to position and retain said triangular panels in an in-use position and to release the same at will for folding, and second readily accessible and usable retaining means operatively mounted on said back panel and releasably engageable with said front panel in a manner to temporarily position and retain all of the panels in compact folded relationship for storage and subsequent erected usage, said first retaining means comprising an open-ended clip which is channel-shaped in cross-section and is designed to fit applicably and removably over upper edges of coacting ones of said triangular panels in a manner to bridge the adjacent and cooperable inner vertical marginal edges of said panels and, in so doing, serving to maintain said panels in coplanar wall-forming relationship, and a link having one end pivotally connected with an end of said clip and its other end pivotally anchored on an oriented interior surface of a cooperating one of said panels.

5. A foldable lawn and garden cart comprising a hopper-type barrow provided with ground engaging wheels and prop-equipped handle means, said barrow embodying companion downwardly converging panels defining front and back walls and having opposed lower ends which are foldably hingedly joined, and load confining side walls, said side walls embodying paired triangular panels which have adjacent inner vertical edges hingedly joined to each other and outer marginal edges hingedly and foldingly joined to coacting marginal edges of said front and back panels, readily accessible and usable first retaining means operatively mounted on predetermined ones of said triangular panels and adapted to position and retain said triangular panels in an in-use position and to release the same at will for folding, and second readily accessible and usable retaining means operatively mounted on said back panel and releasably engageable with said front panel in a manner to temporarily position and retain all of the panels in compact folded relationship for storage and subsequent erected usage, said second retaining means comprising a J-shaped hook which has a shank portion and a hook portion which is such in shape and size that it can be retentively but releasably hooked over the upper marginal edges of the front and back walls when these walls are folded into opposed compact position and relationship for storage needs, and an adapter bracket fixed on an exterior surface of an upper part of said back wall and provided with a socket member, said shank being mounted for operation in said socket member.

6. The lawn and garden cart defined in and according to claim 2, and wherein said hinge means comprises an elongated tubular sheath which is commensurate in length with the length of said coplanar but oblique angled flanges, said sheath being C-shaped in transverse cross-section and having a longitudinal keying slot on one side, the slotted portion of said sheath contacting and being located underneath and partly bridging the respective flanges, and the confronting marginal edges having angularly bent lips which are directed through said slot into the hollow portion of said sheath and are provided with lip assembling and retaining beads.

7. A foldable lawn and garden cart comprising an inverted U-shaped frame embodying a pair of like coplanar legs having free lower ends provided with free-turning ground engaging wheels and upper ends structurally joined by a bight portion providing a push-pull handle, a foldable hopper-like barrow embodying downwardly converging companion panels providing front and back walls, said back panel spanning the space between and being fixedly mounted atop said legs and having a lower end terminating in an angular assembling flange and also having side marginal edges provided with additional assembling flanges, said front panel, like said back panel, also having a lower end terminating in an angular assembling flange which is directed toward said first named assembling flange, said assembling flanges having abutting edges connected by hinge means which allows the front panel to be swung toward and compactly folded atop the back panel, said front panel also having its side marginal edges provided with additional assembling flanges which are directed toward and aligned with said first mentioned assembling flanges, and a pair of spaced parallel side walls situated between the respective side marginal edges of said front and back panels, each side wall comprising a pair of triangular panels which have adjacent inner vertical edges which are foldably joined by hinging means and have outer marginal edges which are oriented with and are joined by hinge means which functions to allow said side walls to be folded inwardly and sandwiched between the front and back walls when the latter walls are folded and collapsed for compact storage readily accessible and usable first retaining means operatively mounted on predetermined ones of said triangular panels and adapted to position and retain said triangular panels in an in-use position and to release the same at will for folding, and second readily accessible and usable retaining means operatively mounted on said back panel and releasably engageable with said front panel in a manner to temporarily position and retain all of the panels in compact folded relationship for storage and subsequent erected usage.

8. The lawn and garden cart defined in and according to claim 7, and wherein said first retaining means comprises an openended clip which is channel-shaped in cross-section and is designed to fit applicably and removably over upper edges of coacting ones of said triangular panels in a manner to bridge the adjacent and cooperable inner vertical marginal edges and, in so doing, serving to maintain said panels in coplanar wall-forming relationship, and a link having one end pivotally connected with an end of said clip and its other end pivotally anchored on an oriented interior surface of a cooperating one of said panels.

9. The lawn and garden cart defined in and according to claim 7, and wherein said second retaining means comprises a J-shaped hook which has a shank portion and a hook portion which is such in shape and size that it can be retentively but releasably hooked over the upper marginal edges of the front and back walls when these walls are folded into opposed compact position and relationship for storage needs, and an adapter bracket fixed on an exterior surface of an upper part of said back wall and provided with a socket member, said shank being mounted for operation in said socket member.

10. The lawn and garden cart defined in and according to claim 7, and wherein the lower free ends of the legs of said U-shaped frame are arcuately curved upwardly and have opposed terminal extensions projecting to predetermined positions beyond the outside peripheral tread portions of said wheels in a manner to act as means capable of lifting the wheels off the supporting surface when the cart is folded and propped against a stationary wall for storing and also to prevent rolling of the cart when thus stored.

* * * * *